(12) United States Patent
Liao (10) Patent No.: US 6,686,706 B1
(45) Date of Patent: Feb. 3, 2004

(54) DEVICE HAVING THREE TRANSISTORS FOR DRIVING LIGHT-EMITTING ELEMENT

(75) Inventor: Tai-Shan Liao, Hsinchu (TW)

(73) Assignee: Precision Instrument Development Center National Science Council, Hsinchu (TW)

( * ) Notice: Subject to any disclaimer, the term of this patent is extended or adjusted under 35 U.S.C. 154(b) by 0 days.

(21) Appl. No.: 10/294,117

(22) Filed: Nov. 14, 2002

(30) Foreign Application Priority Data

Aug. 28, 2002 (TW) ........................................ 91119607 A (51) Int. Cl.[7] .............................................. H05B 37/02
(52) U.S. Cl. ..................... 315/291; 315/151; 372/38.02; 372/38.07
(58) Field of Search ................................ 315/291, 307, 315/169.1, 169.3, 169.2, 169.4, 149, 151, 157, 158; 372/38.02, 38.01, 38.1, 38.07, 38.09; 345/30, 46, 44

(56) References Cited

U.S. PATENT DOCUMENTS 4,488,305 A * 12/1984 Claverie et al. ......... 372/38.01
4,866,430 A * 9/1989 Chek .......................... 315/307
5,402,432 A * 3/1995 Chou ....................... 372/38.07
6,603,342 B2 * 8/2003 Liao et al. .................. 315/129
2001/0050795 A1 * 12/2001 Numata et al. ............. 359/188

FOREIGN PATENT DOCUMENTS

JP 08-330656 * 12/1996

* cited by examiner

*Primary Examiner*—James Clinger
*Assistant Examiner*—Ephrem Alemu
(74) *Attorney, Agent, or Firm*—Volpe and Koenig, P.C.

(57) ABSTRACT

A device for driving a light-emitting element via three transistors includes a driving circuit, a negative voltage circuit, and a protection circuit. The driving circuit has a first transistor and a second transistor for producing a first signal. The negative voltage circuit electrically connected to the driving circuit for transforming the first signal into a second signal to be transmitted to the light-emitting element, and the light-emitting element is driven in response to an operating voltage resulted from the voltage of the second signal and a power voltage. The protection circuit includes a third transistor having two terminals connected to the light-emitting element and the third terminal connected to a base of an NPN transistor for controlling the operating voltage so as to stabilize an output of the light-emitting element.

27 Claims, 9 Drawing Sheets

DEVICE HAVING THREE TRANSISTORS FOR DRIVING LIGHT-EMITTING ELEMENT

FIELD OF THE INVENTION

This invention relates to a driving device with a protection circuit for driving a light emitting element via a low operating voltage, especially to the protection circuit utilizing three transistors to protect the driving device.

BACKGROUND OF THE INVENTION

Because the properties such as long life, low operating voltage needed, fast response, good shock tolerance are needed to fit the requirements of products for being light, thin and miniature, the light-emitting element like light-emitting diodes, laser diodes and liquid crystal diodes not only are applied popularly in the business but also speed up the vigorous developments of the photoelectric industries.

In view of the above-mentioned, some kinds of devices for driving the light-emitting element via a relative low power voltage have been proposed and these devices usually have more transistors or complex circuits composed of some integrated circuit devices.

Figure 1A:
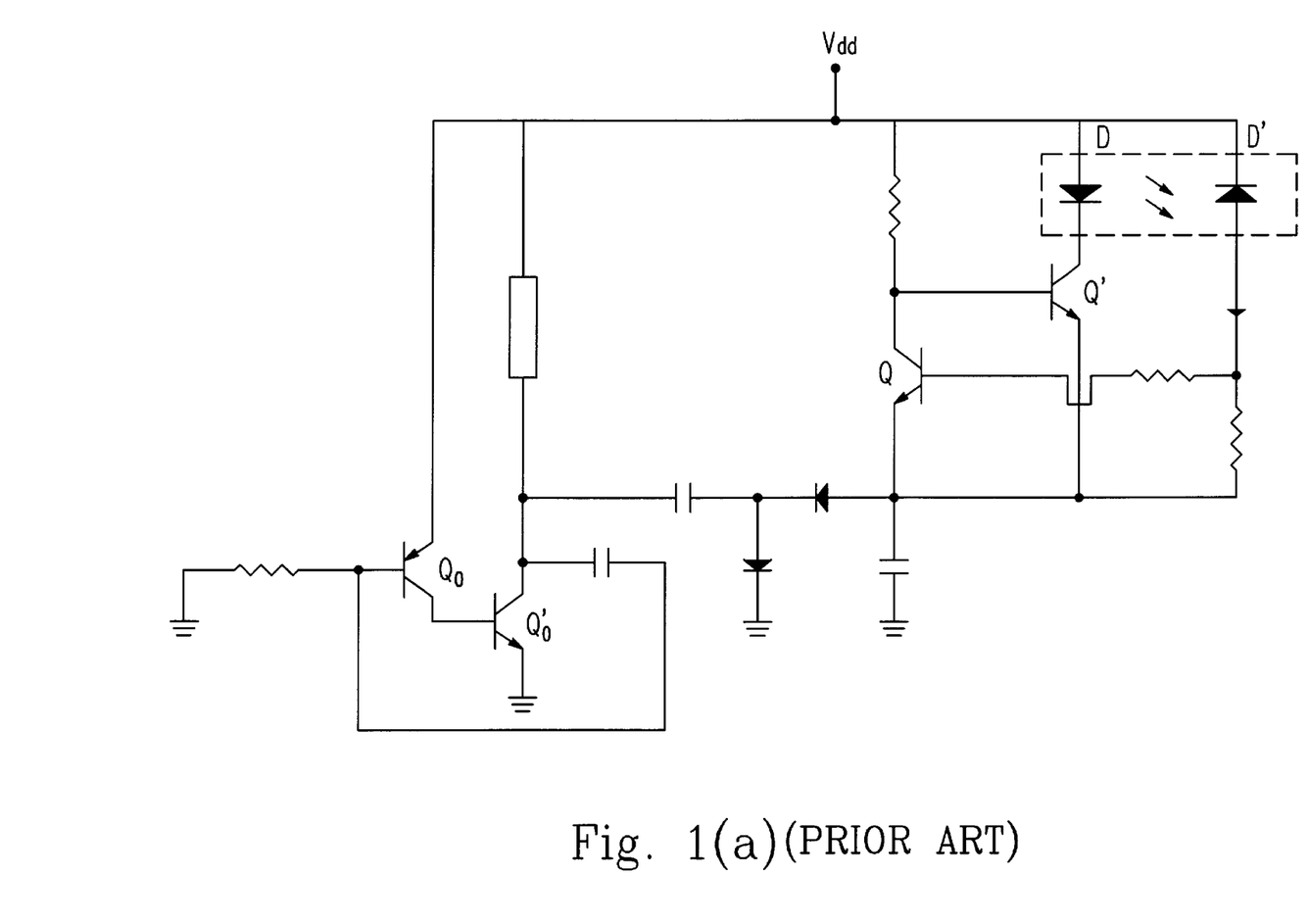
FIGS. 1(a)~(c) show schematic views of devices for driving light-emitting elements according the prior art.
Figure 1B:
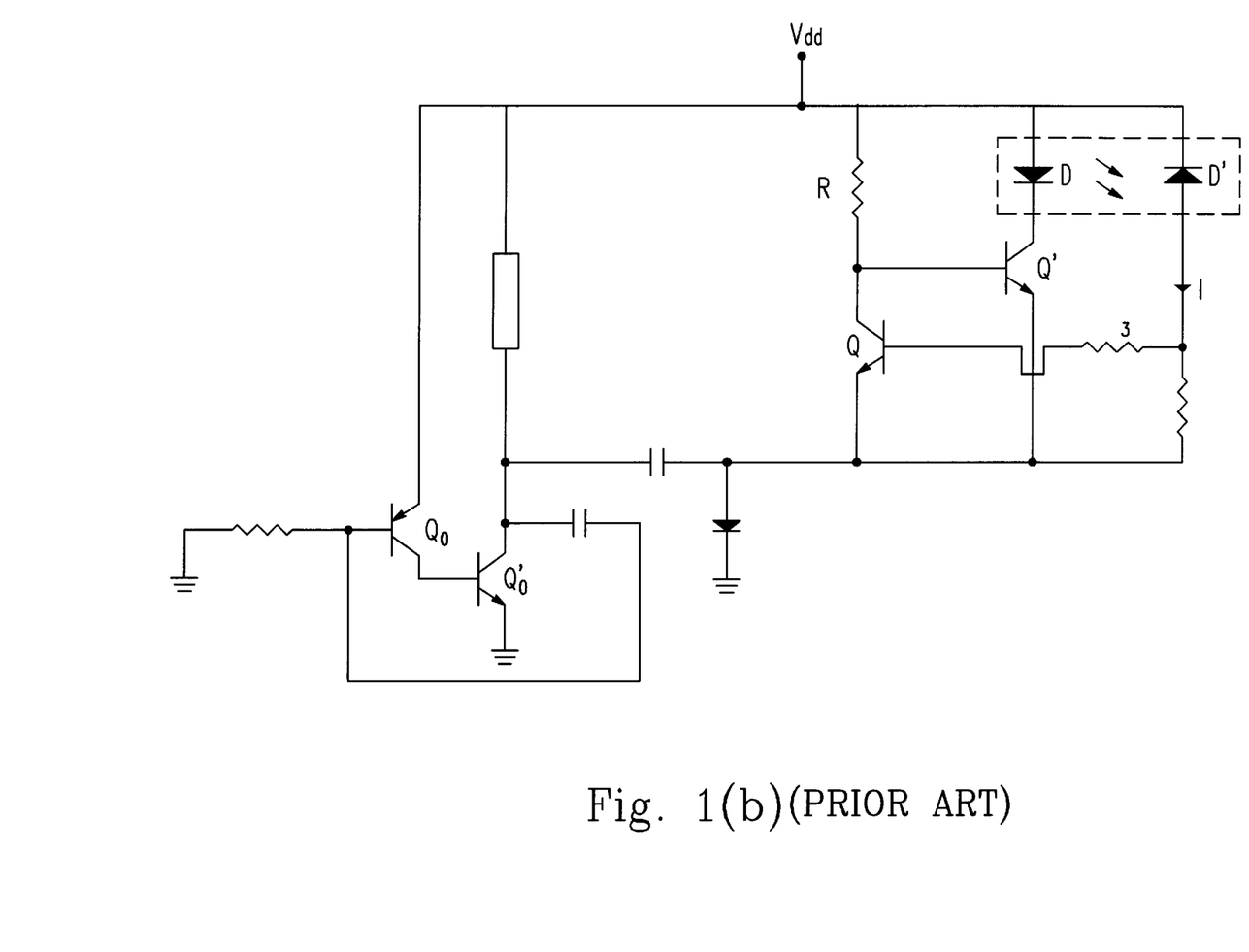
Figure 1C:
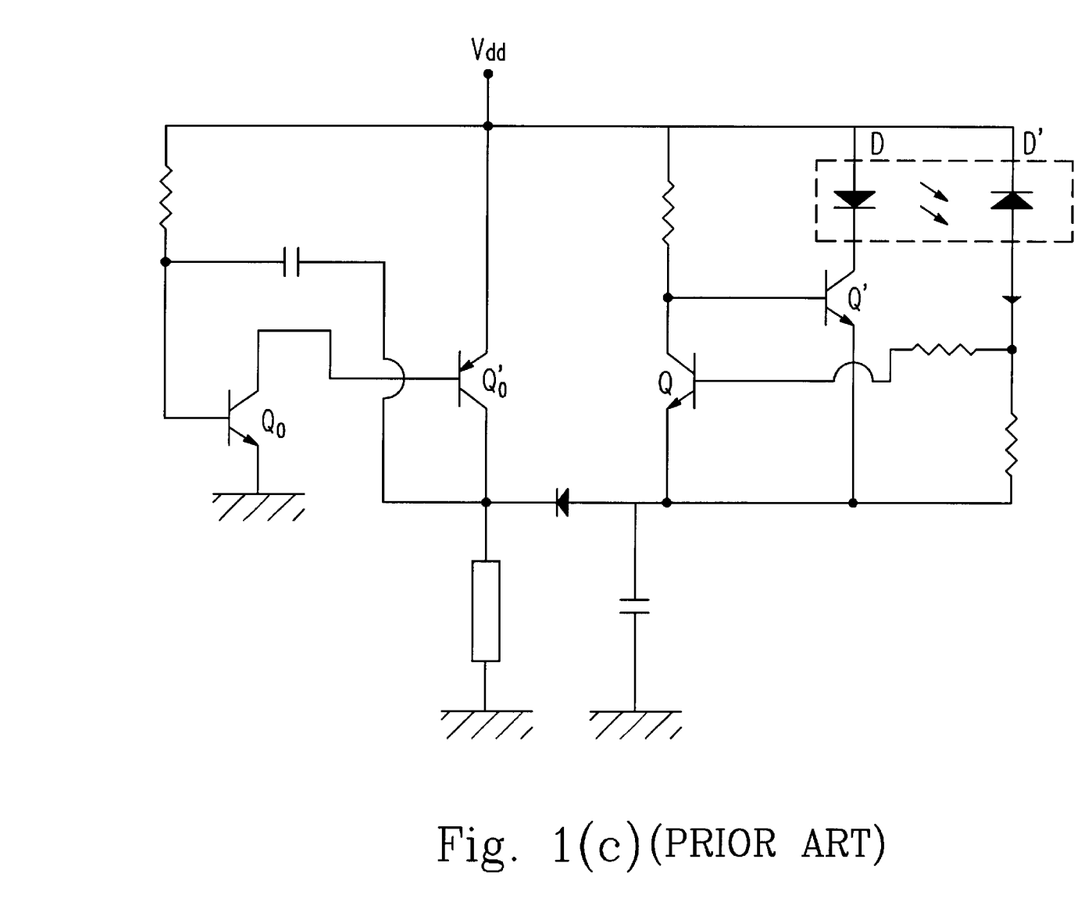

Some light-emitting elements operated near or above 3V need a protection circuit to, maintain normal operation and protect the light-emitting elements. Therefor, how to drive the light-emitting element by the least operating voltage and ensure that it works normally and makes the best economical benefits is the major consideration of this invention. For example, FIGS. 1(a)~(c) show that conventional protection devices for driving the light-emitting element via an operating voltage usually have four transistors Q, Q', $Q_0$, $Q_0'$ which are used to set up a current through a laser diode D. Then the light from the laser diode D hits a photo diode D' to produce an induced photo current through the photo diode D' and ensure the device under normal operation. Though a conventional circuit can drive the light-emitting element by a stably low operating voltage, it needs four transistors to compose the protection circuit. Hence its structure is more complex. Besides, the cost of transistors is more expensive than resistors. For the consideration of the reduction of cost and the simplification of space arrangement of circuits the applicant keeps on carving unflaggingly to develop "a device having three transistors for driving a light-emitting element" through wholehearted experience and research.

SUMMARY OF THE INVENTION

It is an object of the present invention to provide a device having three transistors for driving a light-emitting element via a relatively low operating voltage.

It is another object of the present invention to provide a device with simpler circuit structures and less cost for driving a light-emitting element via a low operating voltage.

According to an aspect of the present invention, the device for driving a luminary via three transistors includes a driving circuit and a negative voltage circuit and a protection circuit. The driving circuit has a first transistor and a second transistor for producing a first signal. The negative voltage circuit is electrically connected to the driving circuit for transforming the first: signal into a second signal to be transmitted to the light-emitting elements thereby the light-emitting elements being driven in response to an operating voltage. The protection circuit includes a third transistor with an emitter and a base both connected to the light-emitting element and a collector connected to the base of the first transistor and the collector of the second transistor for controlling the operating voltage so as to stabilize an output of the light-emitting element.

Preferably, the light-emitting element includes a first diode and a second diode.

Preferably, the first diode is a laser diode and the second diode is a photo diode.

Preferably, the second signal is a negative voltage.

Preferably, the second signal is a direct current signal.

Preferably, the operating voltage is a sum of an absolute voltage of the second signal and a power voltage.

Preferably, the sum of an absolute voltage of the second signal and a power voltage is greater than an absolute voltage of the first signal.

Preferably, the operating voltage is ranged from 1 to 1.5 V.

Preferably, the driving circuit further includes an inductor and a first capacitor.

Preferably, the driving circuit is a first step-up circuit via capacitor-inductor oscillating.

Preferably, the first transistor is a NPN transistor and the second transistor is a PNP transistor.

Preferably, the third transistor is a bipolar transistor.

Preferably, the first signal is an alternating current signal.

Preferably, the negative voltage circuit is a negative multiple voltage circuit.

Preferably, the negative multiple voltage circuit includes a second capacitor, a third capacitor, a third diode and a forth diode. The second capacitor is electrically connected to the driving circuit. The third diode has an anode electrically connected to the second capacitor and a cathode grounded and the forth diode has a cathode electrically connected to the capacitor and an anode of the third diode and an anode. The third capacitor has one terminal electrically connected to the anode of the forth diode and the light-emitting element and another terminal thereof is grounded.

Preferably, the negative voltage circuit is a load voltage circuit and the driving circuit is a second step-up circuit via capacitor-inductor oscillating.

Preferably, the load voltage circuit includes a second capacitor electrically connected to the driving circuit and a third diode having an anode electrically connected to the second capacitor and a cathode grounded.

Preferably, the negative voltage circuit is a rectifier circuit.

Preferably, the rectifier circuit includes a third diode having a cathode electrically connected to the driving circuit and an anode and a second capacitor having one terminal electrically connected to the anode of the third diode and another terminal thereof is grounded.

In accordance with an aspect of the present invention, a device for driving a light-emitting element via three transistors includes a driving circuit, a negative voltage circuit and a protection circuit. The driving circuit has a first transistor and a second transistor for producing a first signal. The negative voltage circuit is electrically connected to the driving circuit for transforming the first signal into a second signal to be transmitted to the light-emitting element; thereby the light-emitting element being driven in response to an operating voltage. The protection circuit has a third transistor having a source and a gate both electrically connected to the light-emitting element and a drain electrically connected to a base of the first transistor and a collector of the second transistor for controlling the operating voltage so as to stabilize an output of the light-emitting element.

Preferably, the light-emitting element includes a first diode and a second diode.

Preferably, the first diode is a laser diode and the second diode is a photo diode.

Preferably, the first signal is an AC signal.

Preferably, the second signal is a negative voltage.

Preferably, the second signal is a DC signal.

Preferably, the operating voltage is a sum of an absolute voltage of the second signal and a power voltage.

Preferably, the operating voltage is ranged from 1 to 1.5 V.

Preferably, the sum of an absolute voltage of the second signal and a power voltage is greater than an absolute voltage of the first signal.

Preferably, the driving circuit further includes an inductor and a first capacitor.

Preferably, the driving circuit is a first step-up circuit via capacitor-inductor oscillating.

Preferably, the first transistor is a NPN transistor and the second transistor is a PNP transistor.

Preferably, the third transistor is a metal oxide semiconductor field effect transistor.

Preferably, the negative voltage circuit is a negative multiple voltage circuit.

Preferably, the negative multiple voltage circuit includes a second capacitor, a third diode, a forth diode and a third capacitor. The second capacitor is electrically connected to a driving circuit. The third diode has an anode electrically connected to the second capacitor and a cathode is grounded. The forth diode has a cathode electrically connected to the second capacitor and an anode of the third diode and an anode. The third capacitor has one terminal electrically connected to the anode of the forth diode and the light-emitting element and another terminal grounded.

Preferably, the negative voltage circuit is a load voltage circuit and the driving circuit is a second step-up circuit via capacitor-inductor oscillating.

Preferably, the load voltage circuit includes a second capacitor electrically connected to a driving circuit and a third diode having an anode electrically connected to the second capacitor and a cathode grounded.

Preferably, the negative voltage circuit is a rectifier circuit.

Preferably, the rectifier circuit includes a third diode having a cathode electrically connected to the driving circuit and an anode and a second capacitor having one terminal electrically connected to the anode of the third diode and another terminal grounded.

For understanding this application further, some figures and detail illustrations are shown as follows:

DETAILED DESCRIPTION OF THE PREFERRED EMBODIMENT

This application "a device for driving a luminary via three transistors" will be illustrated and well understood via the following embodiments and one skilled in the art can accomplish it. However, to put the device into practice is not limited in the forms of the embodiments.

Figure 2:
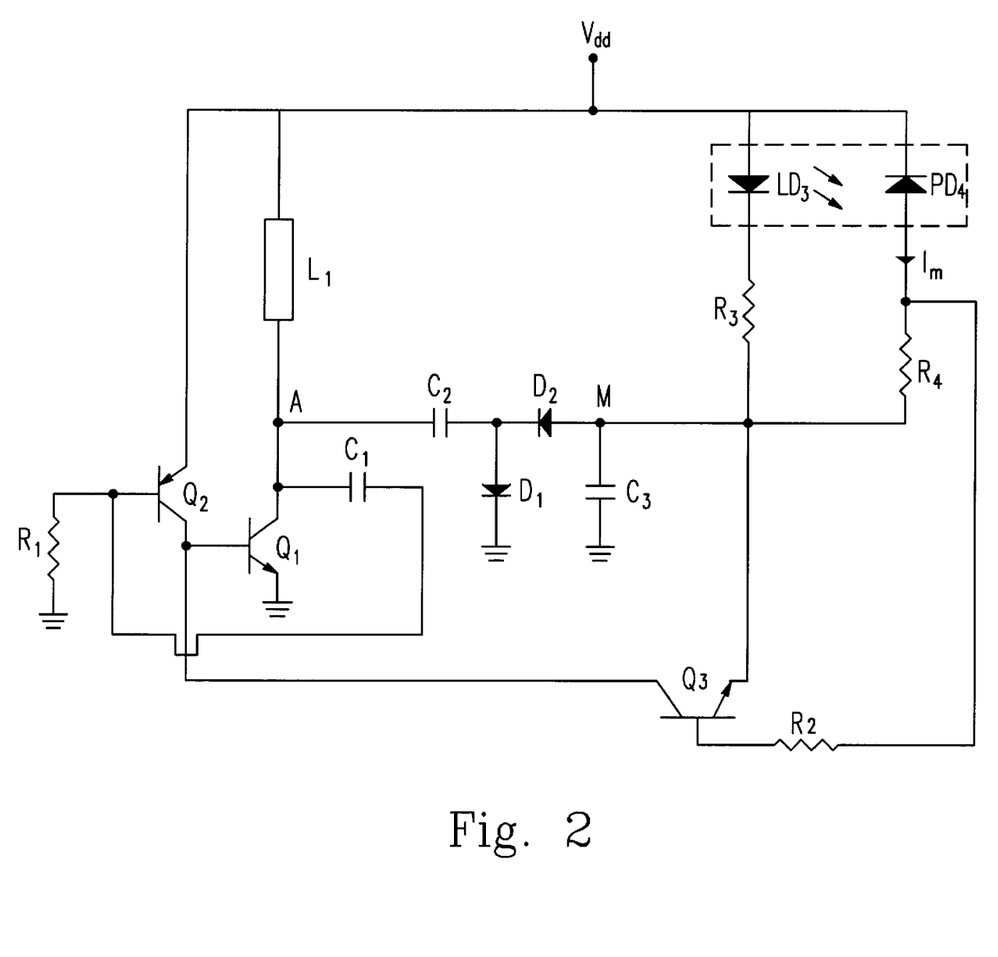
FIGS. 2~4 show schematic views of devices for driving a light-emitting element via three transistors according to the preferred embodiments of the present invention.

Please refer to FIG. 2. FIG. 2 is a sketch map of a detail circuit structure according to the preferred embodiment of the present invention. The driving circuit of the device includes two transistors $Q_1$ and $Q_2$, an inductor $L_1$, and a capacitor $C_1$. The collector of the transistor $Q_2$ is electrically connected to the base of the transistor $Q_1$ and the capacitor $C_1$ is used to connect the collector of the transistor $Q_1$ and the base of the transistor $Q_2$. A grounded resistor is connected to the common node of the base of the transistor $Q_2$ and the capacitor $C_1$ for providing a feedback voltage. The emitter of the transistor $Q_2$ is connected to a power $V_{dd}$ and the emitter of the transistor $Q_1$ is grounded. One terminal of the inductor $L_1$ is connected to the power $V_{dd}$ and the other terminal of the inductor $L_1$ is connected to the collector of the transistor $Q_1$. Because the effect of self-excited oscillation comes from this circuit, the inductor L1 can work under a low operating power voltage. A voltage amplifier is consisted of the collector of the transistor $Q_1$ and the inductor $L_1$ and the node A in the voltage amplifier is connected to a negative multiple voltage circuit. The negative multiple voltage circuit includes two capacitors $C_2$ and $C_3$ and two diodes $D_1$ and $D_2$. The anode of the diode $D_1$ is connected to the capacitor $C_2$ and the cathode is grounded. The cathode of the diode $D_2$ is connected to the capacitor $C_2$ and the diode $D_1$ at the same time. One terminal of the capacitor $C_3$ is connected to the anode of the diode $D_2$ and a light-emitting element of the protection circuit at the same time and the other terminal thereof is grounded. The negative multiple voltage circuit can amplify the alternating current signal which can be transmitted by the driving circuit and transformed it into a direct current signal. Therefor, there is an amplified negative voltage in the common node M of the anode of the diode $D_2$ and the capacitor $C_3$. The absolute value of voltage on node M is greater than the absolute value of voltage on node A.

Finally, the amplified negative voltage will drive the light-emitting element of a protection circuit connected to the node M, wherein the protection circuit is controlled by a transistor $Q_3$. The emitter of the transistor $Q_3$ is connected to the node M, and the collector of the transistor $Q_3$ is connected to the base of the transistor $Q_1$. The anode of the photo diode $PD_4$ is connected to the node M through a resistor $R_4$ and a resistor $R_3$ is connected to a laser diode $LD_3$ and the node M. The operating principles are shown as follows:

When the emitter of the transistor $Q_3$ being connected to the node M receives an amplified negative voltage from the node M, the diode $LD_3$ will keep on inducing the diode $PD_4$. While the diode $LD_3$ continuously induces the diode $PD_4$, the photo-induced current $I_m$ will increase simultaneously and the cross-voltage of the resistor $R_4$ will increase and feed back to make the transistor $Q_3$ conduct. Relatively, the input current of the base of the transistor $Q_1$ will reduce and the output current of the collector of the transistor $Q_1$ will relatively reduce then the absolute value of voltage received by the node M will reduce, too. Because the absolute value of voltage received of the node M reduced, the diode $LD_3$ will less induce the diode $PD_4$ then the $I_m$ will reduce and the cross-voltage of the resistor $R_4$ will reduce simultaneously and feed back to make the transistor $Q_3$ cut off. Relatively, the input current of the base of the transistor $Q_1$ will increase and the output current of the collector of the transistor $Q_1$ will relatively increase then the absolute value of voltage received by the node M will increase, too. Because the absolute value of voltage received of the node M increased, the brightness of the diode $LD_3$ will increase. Things like that will happen again and again until finding out a balance to stabilize the output of luminary.

Figure 3:
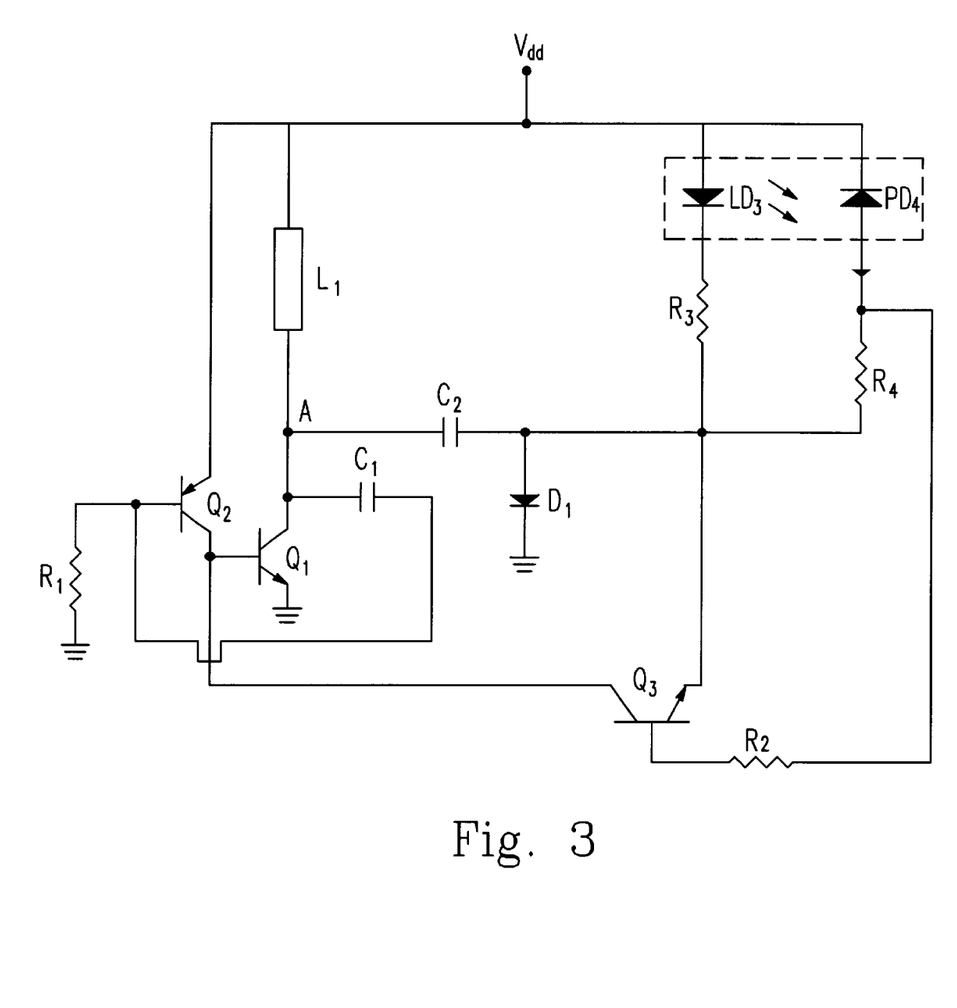

Please refer to FIG. 3. FIG. 3 is another preferred embodiment with a sketch map of detail circuit structures. The circuit structures of FIG. 3 are derived from FIG. 2 by removing the diode $D_2$ and the capacitor $C_3$ and the connecting methods and operating principles thereof are the same as that of FIG. 2. Although the effects of the embodiment shown in FIG. 3 are not as much as the effects of the embodiment shown in FIG. 2, it's still great enough to achieve the desired effects of this invention. Therefore, the disclosure of FIG. 3 shows the circuit structures of this invention is full of variability, even adding or removing an equivalent device will not influence the invention of this application.

Figure 4:
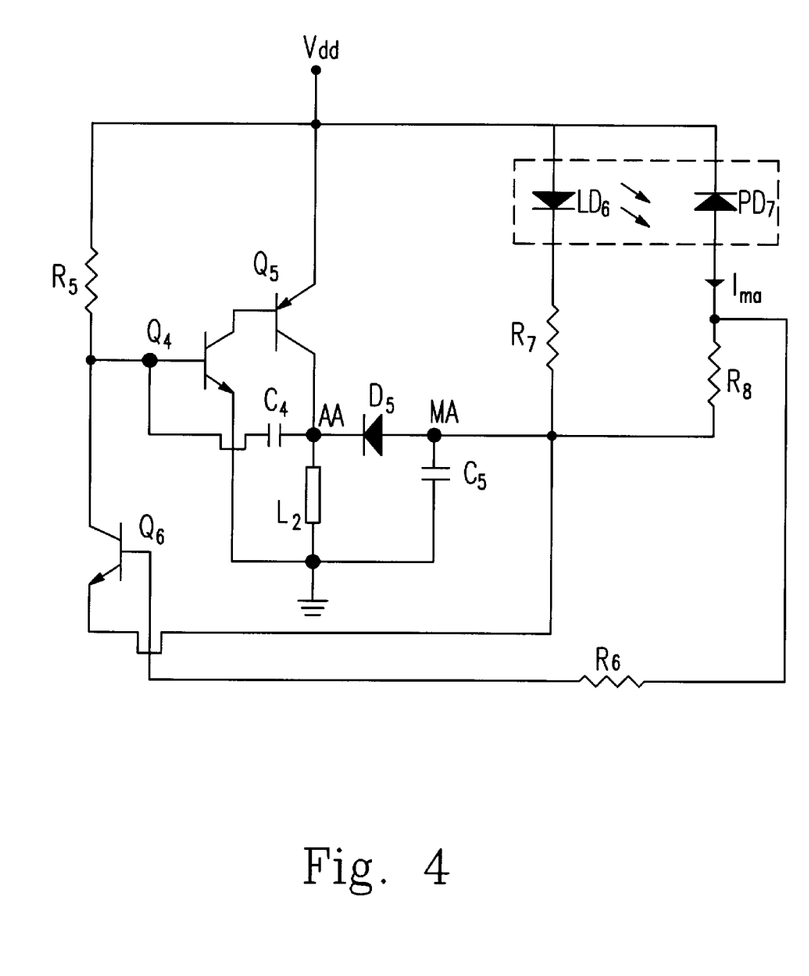

Please refer to FIG. 4. FIG. 4 is another preferred embodiment with a sketch map of detail circuit structures. The driving circuit of FIG. 4 includes two transistors $Q_4$ and $Q_5$, a resistor $R_5$ and a capacitor $C_4$. The collector of the transistor $Q_4$ is connected to the base of the transistor $Q_5$ and the capacitor $C_4$ connects the base of the transistor $Q_4$ and the collector of the transistor $Q_5$. The resistor $R_5$ is connected to the common node of the base of the transistor $Q_4$ and the capacitor $C_4$. The emitter of the transistor $Q_5$ is connected to the power $V_{dd}$ and the emitter of the transistor $Q_4$ is grounded. One terminal of an inductor $L_2$ is grounded and another terminal thereof is connected to the collector of the transistor $Q_5$. Because of the effect of self-excited oscillation come from this circuit, the inductor $L_2$ can work with a low operating power voltage. A voltage amplifier is consisted of the collector of the transistor Q5 and the inductor L2 and the node AA in the voltage amplifier is connected to a rectifier voltage circuit. The rectifier voltage circuit includes one capacitor C5 and one diode D5. The cathode of the diode $D_5$ is connected to the node AA and the anode of the diode $D_5$ is connected to the capacitor $C_5$. One terminal of the capacitor $C_5$ is connected to a node MA of the anode of the diode $D_5$ and the light-emitting element of the protection circuit, and another terminal of the capacitor $C_5$ is grounded. The rectifier voltage circuit can amplify the alternating current signal transmitted by the driving circuit and transform it into a direct current signal. Therefor, there is an amplified negative voltage in the node MA of the anode of the diode $D_5$ and the capacitor $C_5$.

Finally, the amplified negative voltage will drive the light-emitting element of the protection circuit connected to the node MA, wherein the protection circuit is controlled by a transistor $Q_6$. The emitter of the transistor $Q_6$ is connected to the node MA, and the collector of the transistor $Q_6$ is connected to the base of the transistor $Q_4$. There is a resistor $R_6$ connects the base of the transistor $Q_6$ and the anode of a photo diode $PD_7$. The diode $PD_7$ and a resistor $R_8$ are series-wound to each other and connected to the node MA. A laser diode and a resistor $R_7$ are series-wound and connected to the node MA. The operating principles are shown as follows:

When the emitter of the transistor $Q_6$ connected to the node MA receives an amplified negative voltage from the node MA, the diode $LD_6$ will keep on inducing the diode $PD_7$. While the diode $LD_6$ continuously induces the diode $PD_7$, the photo-induced current $I_{ma}$ will increase simultaneously and the cross-voltage of the resistor R8 will increase and feed back to make the transistor $Q_6$ conduct. Relatively, the input current of the base of the transistor $Q_4$ will reduce, the output current of the collector of the transistor $Q_4$ will reduce and the current of the collector of the transistor $Q_5$ will relatively reduce then the absolute value of voltage received by the node MA will reduce, too. Because the absolute value of voltage received of the node MA reduced, the diode $LD_6$ will less induce the diode $PD_7$ then the $I_{ma}$ will reduce and the cross-voltage of resistor R8 will reduce simultaneously and feed back to make the transistor $Q_6$ cut off. Relatively, the input current of the base of the transistor $Q_4$ will increase and the output current of the collector of the transistor $Q_4$ will relatively increase then the absolute value of voltage received by the node MA will increase, too. Because the absolute value of voltage received of the node MA increased, the brightness of the diode $LD_6$ will increase. Things like that will happen again and again until finding out a balance to stabilize the output of luminary.

Figure 5:
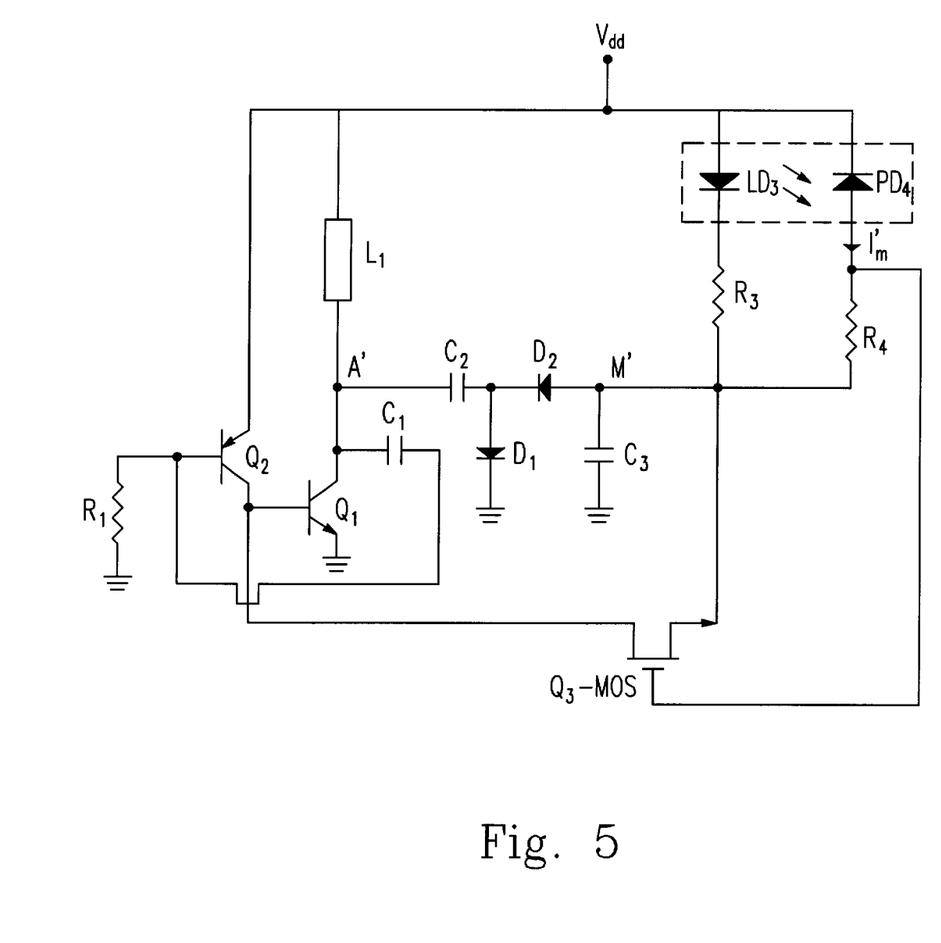
FIGS. 5~7 show schematic views of devices for driving a light-emitting element via three transistors according to another preferred embodiments of the present invention.

Please refer to FIG. 5. FIG. 5 is a sketch map of detail circuit structures from replacing a transistor $Q_3$ of the embodiment FIG. 2 by a metal oxide semiconductor field effect transistor (MOSFET) $Q_3$-MOS.

The driving circuit of the device includes two transistors $Q_1$ and $Q_2$, an inductor $L_1$, a capacitor $C_1$. The collector of the transistor $Q_2$ is electrically connected to the base of the transistor $Q_1$ and one capacitor $C_1$ is used to connect the collector of the transistor $Q_1$ and the base of the transistor $Q_2$. A grounded resistor for bias is connected to the node of the base of the transistor $Q_2$ and the capacitor $C_1$. The emitter of the transistor $Q_2$ is connected to the power. $V_{dd}$ and the emitter of the transistor $Q_1$ is grounded. One terminal of the inductor $L_1$ is connected to the power $V_{dd}$ and the other terminal of the inductor $L_1$ is connected to the collector of the transistor $Q_1$. Because of the effect of self-excited oscillation come from this circuit, the inductor $L_1$ can work with a relatively low working power voltage. There is a voltage amplifier in the node A of the collector of the transistor $Q_1$ and the inductor $L_1$ and the amplifier is connected to a negative multiple voltage circuit. The negative multiple voltage circuit includes two capacitors $C_2$ and $C_3$ and two diodes $D_1$ and $D_2$. The anode of the diode $D_1$ is connected to the capacitor $C_2$ and cathode of the diode $D_1$ is grounded and cathode of the diode $D_2$ is connected to the capacitor $C_2$ and the diode $D_1$ at the same time. One terminal of the capacitor $C_3$ is connected to the anode of the diode $D_2$ and a light-emitting element of the protection circuit at the same time and the other terminal thereof is grounded. The negative multiple voltage circuit can amplify the alternating current signal transmitted by the driving circuit and transform it into a direct current signal. Therefor, there is an amplified negative voltage in the node M' of the anode of the diode $D_2$ and the capacitor $C_3$. The absolute value of voltage of node M' is greater than the absolute value of voltage of node A'.

Finally, the amplified negative voltage will drive the light-emitting element of the protection circuit connected to the node M', wherein the protection circuit is controlled by a MOSFET $Q_3$-MOS. The source of the MOSFET $Q_3$-MOS is connected to the node M' of the anode of the $D_2$ and the $C_3$, and the drain of MOSFET $Q_3$-MOS is connected to the base of the Q1. The anode of the photo diode $PD_4$ and a electric resistor $R_4$ are series-wound and connected the M' and a laser diode $LD_3$ and a resistor $R_3$ are series-wound and connected to the M'. The operating principles are shown as follows:

When the source of the MOSFET $Q_3$-MOS connected to the node M' receives an amplified negative voltage from the node M', the diode $LD_3$ will keep on inducing the diode $PD_4$. While the diode $LD_3$ continuously induces the diode $PD_4$, the photo-induced current $I_m'$ will increase simultaneously and the cross-voltage of the resistor $R_4$ will increase and feed back to make the MOSFET $Q_3$-MOS conduct. Relatively, the input current of the base of the transistor $Q_1$ will reduce and the output current of the collector of the transistor $Q_1$ will relatively reduce then the absolute value of voltage received by the node M' will reduce, too. Because the absolute value of voltage received of the node M' reduced, the diode $LD_3$ will less induce the diode $PD_4$ then the $I_m'$ will reduce and the cross-voltage of resistor $R_4$ will reduce simultaneously and feed back to make the MOSFET $Q_3$-MOS cut off. Relatively, the input current of the base of the transistor $Q_1$ will increase and the output current of the collector of the transistor $Q_1$ will relatively increase then the absolute value of voltage received by the node M' will increase, too. Because the absolute value of voltage received of the node M' increased, the brightness of the diode $LD_3$ will increase. Things like that will happen again and again until finding out a balance to stabilize the output of light-emitting element.

Figure 6:
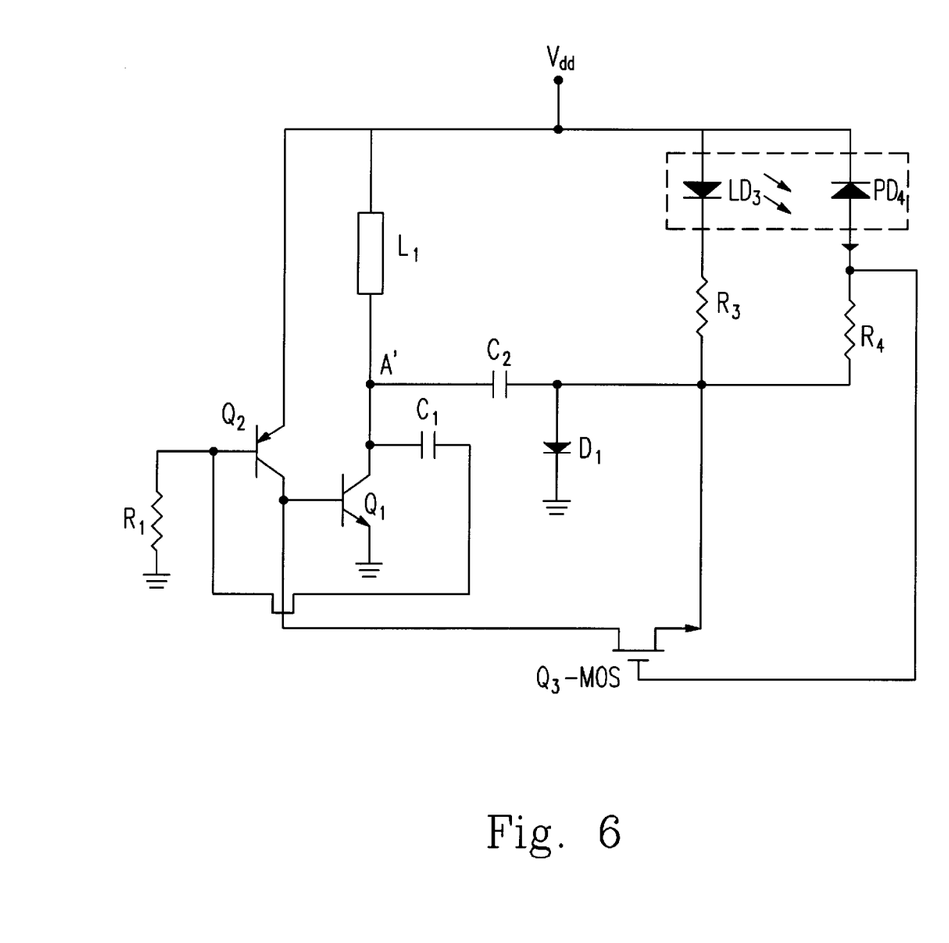

Please refer to FIG. 6. FIG. 6 is another preferred embodiment with a sketch map of detail circuit structures. The circuit structures of FIG. 6 are derived from FIG. 5 by removing a diode $D_2$ and a capacitor $C_3$ and the connecting methods and operating principles are the same as that of FIG. 5. Although the effects of the embodiment shown in FIG. 6 are not as much as the effects of the embodiment shown in FIG. 5, it's still great enough to achieve the wanted effects of this invention. Therefore, the disclosure of FIG. 6 shows the circuit structures of this invention is full of variability, even adding or removing an equivalent device will not influence the invention of this application.

Figure 7:
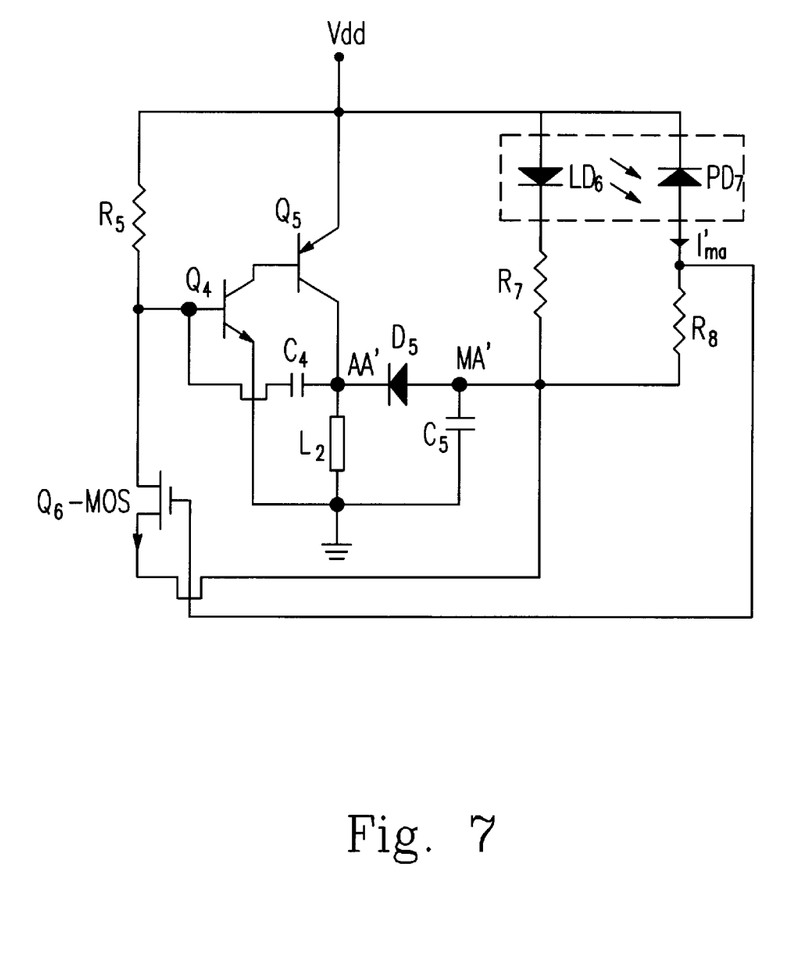

Please refer to FIG. 7. FIG. 7 is a sketch map of detail circuit structures derived from embodiment FIG. 4 by removing the transistor $Q_6$ with a MOSFET $Q_6$-MOS. The driving circuit of FIG. 7 includes two transistors $Q_4$ and $Q_5$, a resistor $R_5$ and a capacitor $C_4$. The collector of the transistor $Q_4$ is connected to the base of the transistor $Q_5$ and the capacitor $C_4$ connects the base of the transistor $Q_4$ and the collector of the transistor $Q_5$. The resistor $R_5$ is connected to the node of the base of the transistor $Q_4$ and the capacitor $C_4$. The emitter of the transistor $Q_5$ is connected to the power $V_{dd}$ and the emitter of the transistor $Q_4$ is grounded. One terminal of an inductor $L_2$ is grounded and another terminal is connected to the collector of the transistor $Q_5$. Because of the effect of self-excited oscillation come from this circuit, the inductor $L_2$ can work with a relatively low working operating voltage. There is a voltage amplifier in the node AA' of the collector of the transistor $Q_5$ and the inductor $L_2$ and the amplifier is connected to a rectifier voltage circuit. Said rectifier voltage circuit includes one capacitor $C_5$ and one diode $D_5$ The cathode of the diode $D_5$ is connected to the node AA' and the anode of the diode $D_5$ is connected to the capacitor $C_5$. One terminal of the capacitor $C_5$ is connected to the anode of the diode $D_5$ and the light-emitting element of the protection circuit, and another terminal of the capacitor $C_5$ is grounded. The rectifier voltage circuit can amplify the alternating current signal transmitted by the driving circuit and transform it into a direct current signal. Therefor, there is an amplified negative voltage in the node MA' of the anode of the diode $D_5$ and the capacitor $C_5$.

In the final, the amplified negative voltage will drive the light-emitting element of the protection circuit connected to the node MA', wherein the protection circuit is controlled by a MOSFET $Q_6$-MOS. The source of the MOSFET $Q_6$-MOS is connected to the node MA', and the drain of the MOSFET $Q_6$-MOS is connected to the base of the transistor $Q_4$. The gate of the MOSFET $Q_6$-MOS is series-wound to the anode of the diode $PD_7$ and a resistor $R_8$. The diode $PD_7$ and the resistor $R_8$ are series-wound to each other and connected to the node MA'. The diode $LD_6$ and the resistor $R_7$ are series-wound and connected to the node MA'. The operating principles are shown as follows:

When the source of the MOSFET $Q_6$-MOS connected to the node MA' receives an amplified negative voltage from the node MA', the diode $LD_6$ will keep on inducing the diode $PD_7$. While the diode $LD_6$ continuously induces the diode $PD_7$, the photo-induced current $I_{ma}'$ will increase simultaneously and the cross-voltage of resistor $R_8$ will increase and feed back to make the MOSFET $Q_6$-MOS conduct. Relatively, the input current of the base of the transistor $Q_4$ will reduce, the output current of the collector of the transistor $Q_4$ will reduce and the current of the collector of the transistor $Q_5$ will relatively reduce then the absolute value of voltage received by the node MA' will reduce, too. Because the absolute value of voltage received of the node MA' reduced, the diode $LD_6$ will less induce the diode $PD_7$ then the $I_{ma}'$ will reduce and the cross-voltage of the resistor $R_8$ will reduce simultaneously and feed back to make the MOSFET $Q_6$-MOS cut off. Relatively, the input current of the base of the transistor $Q_4$ will increase and the output current of the collector of the transistor $Q_4$ will relatively increase then the absolute value of voltage received by the node MA' will increase, too. Because the absolute value of voltage received of the node MA' increased, the brightness of the diode $LD_6$ will increase. Things like that will happen again and again until finding out a balance to stabilize the output of luminary.

In the view of above-mentioned, this application is a driving circuit controlled by three transistors. The first and second transistors are bipolar transistors (NPN or PNP) and make a self-excited oscillator up. Said third transistor is a bipolar transistor or a metal oxide semiconductor field effect transistor (MOSFET). Besides, the third transistor can receive a feedback signal and control the transmission of the oscillator to operate the light-emitting element continuously and stabilize the output of the light-emitting element.

In the view of above-mentioned, the invention has novelty, practicability and progressiveness. While the invention has been described in terms of what are presently considered to be the most practical and preferred embodiments, it is to be understood that the invention needs not be limited to the disclosed embodiment such as the third transistor must be a bipolar transistor or a metal oxide semiconductor field effect transistor and the light-emitting element must be a laser diode. On the contrary, it is intended to cover various modifications and similar arrangements included within the spirit and scope of the appended claims which are to be accorded with the broadest interpretation so as to encompass all such modifications and similar structures.

What is claimed is:

1. A device for driving a light-emitting element via three transistors, comprising:

a driving circuit having a first transistor and a second transistor for producing a first signal;

a negative voltage circuit electrically connected to said driving circuit for transforming said first signal in to a second signal to be transmitted to said light-emitting element thereby said light-emitting element being driven in response to an operating voltage; and a protection circuit comprising a third transistor having an emitter and a base both connected to said light-emitting element and a collector connected to a base of said first transistor and a collector of said second transistor for controlling said operating voltage so as to stabilize an output of said light-emittimg element.

2. The device as claimed in claim 1, wherein said light-emitting element comprises a first diode and a second diode.

3. The device as claimed in claim 2, wherein said first diode is a laser diode and said second diode is a photo diode.

4. The device as claimed in claim 1, wherein said second signal is a negative voltage.

5. The device as claimed in claim 1, wherein said second signal is a direct current signal.

6. The device as claimed in claim 1, wherein said operating voltage is a sum of an absolute voltage of said second signal and a power voltage.

7. The device as claimed in claim 6, wherein said sum of an absolute voltage of said second signal and a power voltage is greater than an absolute voltage of said first signal.

8. The device as claimed in claim 6, wherein said operating voltage is ranged from 1 to 1.5 V.

9. The device as claimed in claim 1, wherein said driving circuit further composes an inductor and a first capacitor.

10. The device as claimed in claim 1, wherein said driving circuit is a first step-up circuit via capacitor-inductor oscillating.

11. The device as claimed in claim 1, wherein said first transistor is a NPN transistor and said second transistor is a PNP transistor.

12. The device as claimed in claim 1, wherein said third transistor is a bipolar transistor.

13. The device as claimed in claim 1, wherein said first signal is an alternating current signal.

14. The device as claimed in claim 1, wherein said negative voltage circuit is a negative multiple voltage circuit.

15. The device as claimed in claim 14, wherein said negative multiple voltage circuit comprises:
 a second capacitor electrically connected to said driving circuit;
 a third diode having an anode electrically connected to said second capacitor and a cathode grounded;
 a forth diode having a cathode electrically connected to said second capacitor and an anode of said third diode and an anode; and
 a third capacitor having one terminal electrically connected to said anode of said forth diode and said light-emitting element and another terminal grounded.

16. The device as claimed in claim 1, wherein said negative voltage circuit is a load voltage circuit and said driving circuit is a second step-up circuit via capacitor-inductor oscillating.

17. The device as claimed in claim 16, wherein said load voltage circuit comprises:

a second capacitor electrically connected to said driving circuit; and
 a third diode having an anode electrically connected to said second capacitor and a cathode grounded.

18. The device as claimed in claim 1, wherein said negative voltage circuit is a rectifier circuit.

19. The device as claimed in claim 18, wherein said rectifier circuit comprises:
 a third diode having a cathode electrically connected to said driving circuit and an anode; and
 a second capacitor having one terminal electrically connected to said anode of said third diode and another terminal grounded.

20. A device for driving a light-emitting element via three transistors, comprising:
 a driving circuit having a first transistor and a second transistor for producing a first signal;
 a negative voltage circuit electrically connected to said driving circuit for transforming said first signal in to a second signal to be transmitted to said light-emitting element thereby said light-emitting element being driven in response to an operating voltage; and
 a protection circuit having a third transistor having a source and a gate both electrically connected to said light-emitting element and a drain electrically connected to a base of said first transistor and a collector of said second transistor for controlling said operating voltage so as to stabilize an output of said light-emitting element.

21. The device as claimed in claim 20, wherein said first signal is an AC signal.

22. The device as claimed in claim 20, wherein said driving circuit further composes an inductor and a first capacitor.

23. The device as claimed in claim 20, wherein said driving circuit is a first step-up circuit via capacitor-inductor oscillating.

24. The device as claimed in claim 20, wherein said third transistor is a metal oxide semiconductor field effect transistor.

25. The device as claimed in claim 20, wherein said negative voltage circuit is a negative multiple voltage circuit.

26. The device as claimed in claim 20, wherein said negative voltage circuit is a load voltage circuit and said driving circuit is a second step-up circuit via capacitor-inductor oscillating.

27. The device as claimed in claim 20, wherein said negative voltage circuit is a rectifier circuit.

* * * * *